US012755594B2

(12) United States Patent
Paderno et al.

(10) Patent No.: US 12,755,594 B2
(45) Date of Patent: Oct. 6, 2026

(54) METHOD AND SYSTEM FOR CONTROLLING ACCESS TO AN ENVIRONMENT

(71) Applicant: Inxpect S.p.A., Brescia BS (IT)

(72) Inventors: Ivan Paderno, Brescia BS (IT); Gabriele Gasperi, Brescia BS (IT)

(73) Assignee: Inxpect S.p.A., Brescia BS (IT)

( * ) Notice: Subject to any disclaimer, the term of this patent is extended or adjusted under 35 U.S.C. 154(b) by 12 days.

(21) Appl. No.: 18/906,486

(22) Filed: Oct. 4, 2024

(65) Prior Publication Data

US 2025/0118125 A1 Apr. 10, 2025

(30) Foreign Application Priority Data

Oct. 9, 2023 (IT) ........................ 102023000020949

(51) Int. Cl.
*G07C 9/30* (2020.01)
*G01S 13/04* (2006.01)

(52) U.S. Cl.
CPC ................ *G07C 9/30* (2020.01); *G01S 13/04* (2013.01)

(58) Field of Classification Search
CPC . G07C 9/30; G01S 13/04; G01S 13/87; G01S 13/881; G01S 13/886; F16P 3/147; B25J 9/16
USPC .......................................................... 340/5.2
See application file for complete search history.

(56) References Cited

U.S. PATENT DOCUMENTS 11,097,422 B2 * 8/2021 Denenberg ............. B25J 9/1666
11,820,025 B2 * 11/2023 Vu .......................... G01S 17/87
12,027,029 B2 * 7/2024 Sedig ................... G08B 13/183
12,365,089 B2 * 7/2025 Weber .................... B25J 9/1676
2014/0277723 A1 * 9/2014 Nishimura ......... G05B 19/4061 700/255
2019/0126889 A1 * 5/2019 Oman ................... B60R 25/243
2022/0176560 A1 * 6/2022 Akagi .................... B25J 9/1676
2023/0116119 A1 * 4/2023 Tögel ...................... G01S 13/04 342/28

(Continued)

FOREIGN PATENT DOCUMENTS

EP 3978210 4/2022
EP 4163670 4/2023
EP 4205914 7/2023

OTHER PUBLICATIONS

Search report and written opinion dated May 15, 2024; Italian Application No. 102023000020949; 11 pages (Italian and English).

*Primary Examiner* — Nam V Nguyen
(74) *Attorney, Agent, or Firm* — RANKIN, HILL & CLARK LLP; Erik J. Overberger

(57) ABSTRACT

A set of one or more radar sensors controls accesses of targets to an environment with a hazardous device. The radar sensors start the detection in a first region of interest in an access path to the environment. Upon the detection of a target, the hazardous device is commanded a first safety measure, the detection in the first region of interest is interrupted, and the detection is started at a second region of interest arranged more internally than the first region of interest. Upon the detection of a target in the second region of interest, a second safety measure is activated. Instead, in the absence of targets in the second region of interest for a predetermined time, the detection in the second region of interest is interrupted, and the detection in the first region of interest is restarted.

10 Claims, 3 Drawing Sheets

(56) References Cited

U.S. PATENT DOCUMENTS

2023/0202037 A1* 6/2023 Andreoni ............... B25J 9/1676
700/245

* cited by examiner

METHOD AND SYSTEM FOR CONTROLLING ACCESS TO AN ENVIRONMENT

FIELD OF THE INVENTION

The present invention is developed in the technical field of radar detection to control access to an environment, in particular environments with the presence of hazardous devices, for example in the industrial field.

BACKGROUND OF THE INVENTION

It is known in the industrial field to use sensors to detect the access of staff to areas where hazardous devices are present, such as machinery with movable parts. Usually two (or more) regions of interest are defined, one, which extends farther from the machinery, which causes the machinery to slow down upon the entrance of a target, and one, closer to the machinery, which causes the stop thereof.

The sensors used for this purpose include photoelectric barriers, laser scanners and radars. Radar sensors have advantages in terms of flexibility and robustness in hostile environments, but they cause difficulties in generating regions of interest of small size, depending on the shape of the region of interest.

In particular, the simplest region of interest which can define a radar sensor is a circular sector, identified by a radius of distance from the sensor, and an opening angle of the sector. Often, however, a single circular sector is not sufficient to adequately monitor all possible machine access trajectories. It is thus common to install several radar sensors, appropriately positioned and oriented, which together identify the desired regions of interest. Such regions become particularly complex when the access path to the machinery is not delimited laterally, and thus a possibility of access from several directions is envisaged.

Alternatively or in addition, with a greater computational burden, each radar sensor can cover an area which is not given by a single circular sector, but by the union of a plurality of circular sectors centred on the same radar sensor. Thereby, a single radar sensor or a small number of radar sensors can cover a region of interest with an approximately rectangular plan, more versatile from the point of view of the final shape of the monitored area.

When an outermost area must be distinguished, for slowing down the machinery, and an innermost area for stopping, it is possible for each radar sensor of the overall arrangement to define two respective distinct regions of interest. However, in this case it is customary for each such region to be identified by a single circular sector or circular crown.

In fact, the simultaneous coverage of two areas by the same radar sensor constitutes a computational burden, which is acceptable only as long as the shape of the areas is simple. Instead, when a radar sensor covers more complex areas, such as approximately rectangular areas, the simultaneous coverage of two areas with complex shapes requires excessive time by the radar sensor to carry out all the necessary processing, often causing unacceptable delays in target signalling, as well as increasing the radar sensor calculation capacity and thus its cost.

SUMMARY OF THE INVENTION

The object of the present invention is to solve the drawbacks of the prior art, and in particular to allow a single radar sensor to identify regions of interest such as to trigger different safety measures, without excessively increasing the computational burden, and thus allowing the use of areas with more complex shapes for each sensor with respect to a single circular sector.

These and other objects are achieved by a method and a system for controlling access to an environment according to any one of the appended claims.

In accordance with the invention, at least one radar sensor detects target access to a first region of interest in the access path to an area in which a device is present, such as a machine with movable parts. When the access of a target to the first region of interest is detected, a first safety measure is triggered, such as the slowdown of a machine. Furthermore, the detection in the first region of interest is interrupted, and the detection of target access to a second region of interest in the access path is started.

The second region is closer to the potentially hazardous device, to be encountered after the first region by a target approaching the device. Upon the detection of a target in the second region, a second safety measure is triggered, such as turning off the hazardous device.

The radar sensor interrupts detection in the second region, and resumes detection in the first region, if the absence of targets in the second region results for a predetermined time.

Advantageously, the radar sensor, while having the first and the second region of interest in memory, does not verify whether or not a target is present in both regions of interest in the same detection cycle, but only in one of them. In particular, in a first moment the radar only carries out the processes to determine if there are targets in the first region, but not in the second region for some cycles, and subsequently it only determines if the targets are in the second region, but not in the first for other cycles. The additional processing to command the sensor to switch between the two regions of interest is instead inexpensive. Therefore, the time employed by the processing of each cycle is limited, and there are no significant delays in target signalling, even in the case of the use of complex regions of interest.

Furthermore, although the slowdown and stop areas are not active at the same time, this does not significantly reduce the system safety. In fact, by arranging the regions of interest so that the slowdown area is encountered before the stop area by a target approaching the hazardous device, the activation of the safety measures occurs in a moment equivalent to the case in which the two regions were always operating at the same time, except for a minimum time delay due to the change of mode, compensable by slightly increasing the size of the slowdown area.

Further features and advantages of the invention will be recognisable by a person skilled in the art from the following detailed description of exemplary embodiments of the invention.

BRIEF DESCRIPTION OF THE FIGURES

For a better understanding of the following detailed description, some embodiments of the invention are illustrated in the accompanying drawings, wherein.

DETAILED DESCRIPTION

Figure 1:
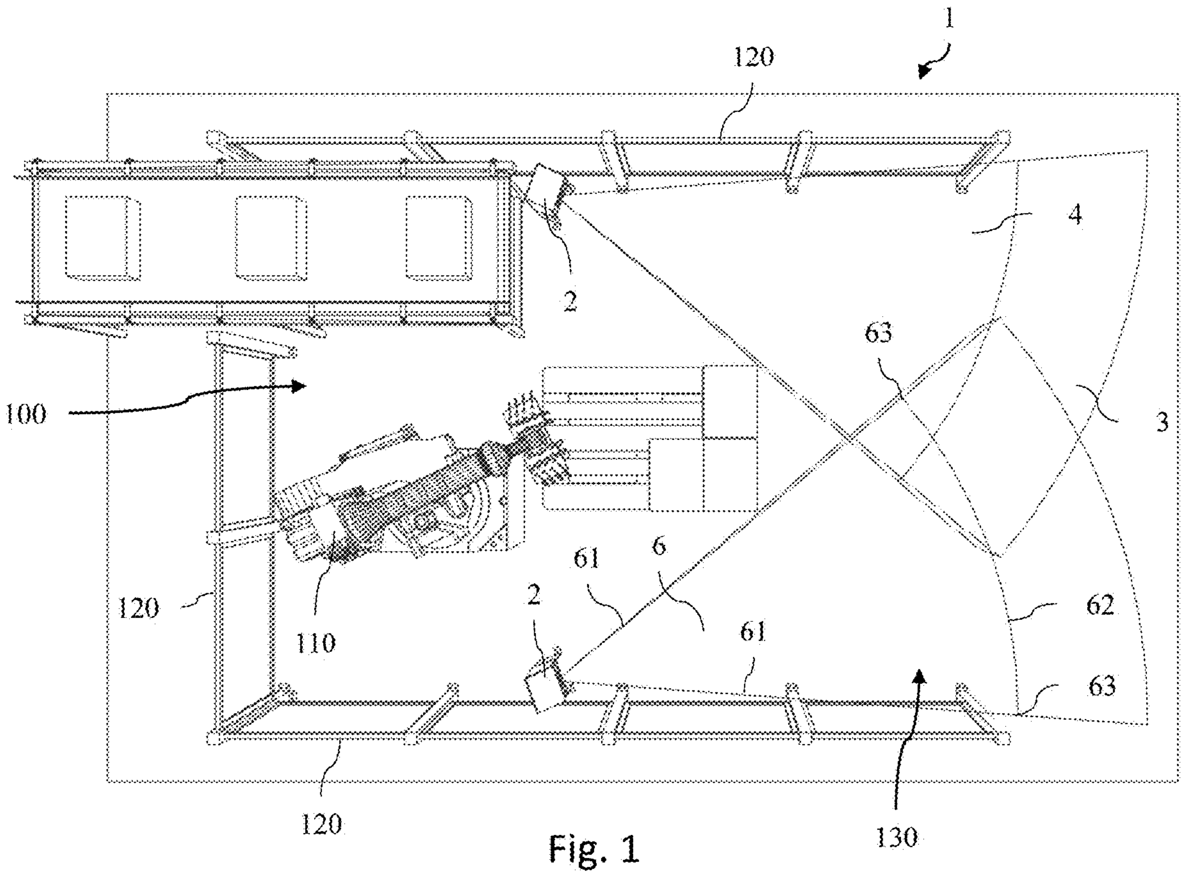
FIG. 1 shows an example of a system for controlling access to an environment according to an embodiment of the invention.

A system for controlling access to an environment is generally indicated with the number 1. The system 1 comprises one or more radar sensors 2 and a control system (not illustrated). The control system can comprise one or more controllers, which may or may not be integrated, partially or totally, in the radar sensors 2.

The environment 100 to which access is to be monitored is an environment in which a hazardous device 110 is present. The hazardous device 110 can be a machine with one or more parts moving automatically. In other embodiments, the hazardous device can be a device with exposed active electrical components, or other hazardous sources, without necessarily including movable parts.

The environment 100 can be delimited on one or more sides by one or more barriers 120, for example fence portions such as wire mesh, or walls of a room. The environment 100 is accessible, by an operator from an external area, along one or more access paths 130 which lead to the hazardous device 110. Each access path 130 crosses at least one side of the environment 100 which is not closed by a barrier 120. In some embodiments, the environment 100 of the hazardous device 110 is not delimited by any barriers 120, and thus access to the environment 100 is permitted from the external area through all its sides.

Each radar sensor 2 of the system 1 is positioned along an access path 130 to the environment 100. For example, radar sensors 2 can be positioned in the access path 130, or at sides or end portions of the access path 130, or near the access path 130.

In a first detection mode, the control system controls each radar sensor 2 to start the cyclic detection of the access of targets 200 to a first region of interest 3 which occupies at least a portion of the access path 130.

Preferably, in the presence of more than one radar sensor 2, in the first detection mode the radar sensors 2 are configured to detect together the access of targets 200 to the first region of interest 3. In other words, the first region of interest 3 can consist of the union of a plurality of first radar regions 31, monitored by distinct radar sensors 2, each of which detects the access of targets 200 to the respective first radar region 31. The first radar regions 31 are generally at least partly overlapping each other. Optionally, not all radar sensors 2 in the first mode are active, but some radar sensors 2 can be envisaged to be activated only in other modes, as described in the following.

In the case of a single radar sensor 2, the first region of interest 3 coincides with the first radar region 31 of the single radar sensor 2.

The first region of interest 3, overall, is shaped to occupy all the sides of the environment 100 free of barriers 120. In other words, the first region of interest 3 is interposed between the environment 100 and the external area, so that a target 200 coming from the external area cannot reach the environment 100 without crossing the first region of interest 3.

The first region of interest 3 can optionally also extend into the environment 100, but preferably the first region of interest 3 does not cover the hazardous device 110. This is advantageous in the case of a hazardous device 110 with movable parts, because otherwise the movable parts could be detected by the radar sensors 2, causing false alarms. In a less preferred alternative, the radar sensor 2 can envisage appropriate processing of a known type to recognise and ignore specific types of targets 200, such as the movable parts in question, and thus it is not necessary to exclude the hazardous device 110 from the first region of interest 3.

Figure 3:
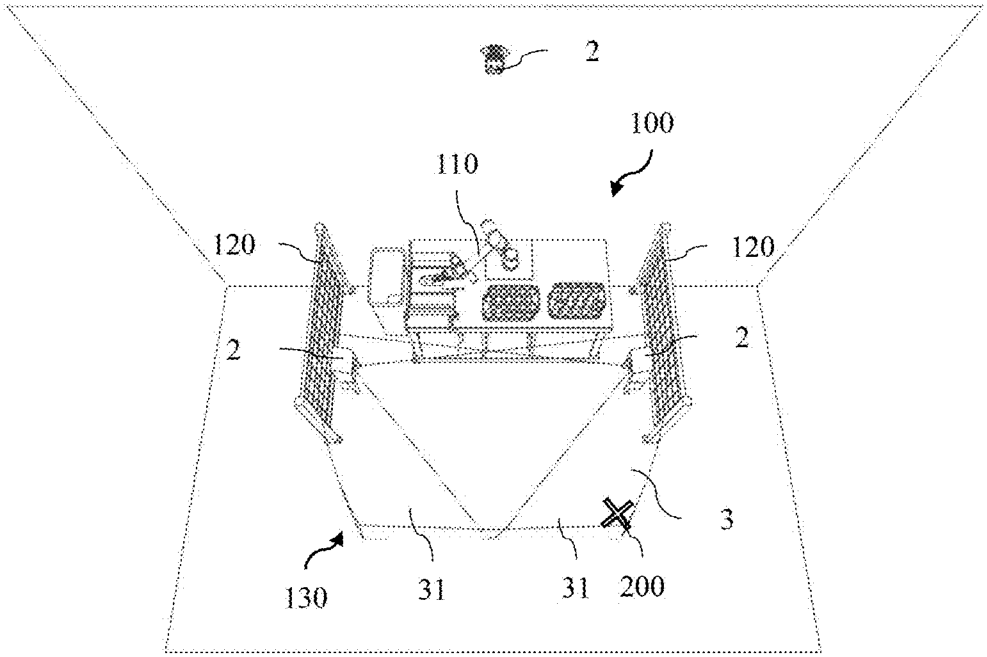
FIGS. 3 to 5 show another embodiment of a system for controlling access to an environment, in three different detection modes.

The first detection mode is substantially kept active in conditions in which no target 200 is detected. Upon the detection of the access of a target 200 in the first region of interest 3 as shown in FIG. 3, the first detection mode is interrupted, and a second detection mode is started.

Furthermore, again upon detecting the access of a target 200 in the first region of interest 3, the control system commands the hazardous device 110 to activate a first safety measure. Preferably, the first safety measure includes slowing a movement speed of at least one movable part of the hazardous device 110. However, other safety measures can be envisaged by a person skilled in the art, both in the case of machinery with movable parts, and in the case of a hazardous device 110 without movable parts.

The command of the first safety measure and the passage from the first to the second detection mode are preferably substantially simultaneous, but in other embodiments the two events can occur in succession, for example first the command of the first safety measure, and then the passage from the first to the second detection mode.

Figure 4:
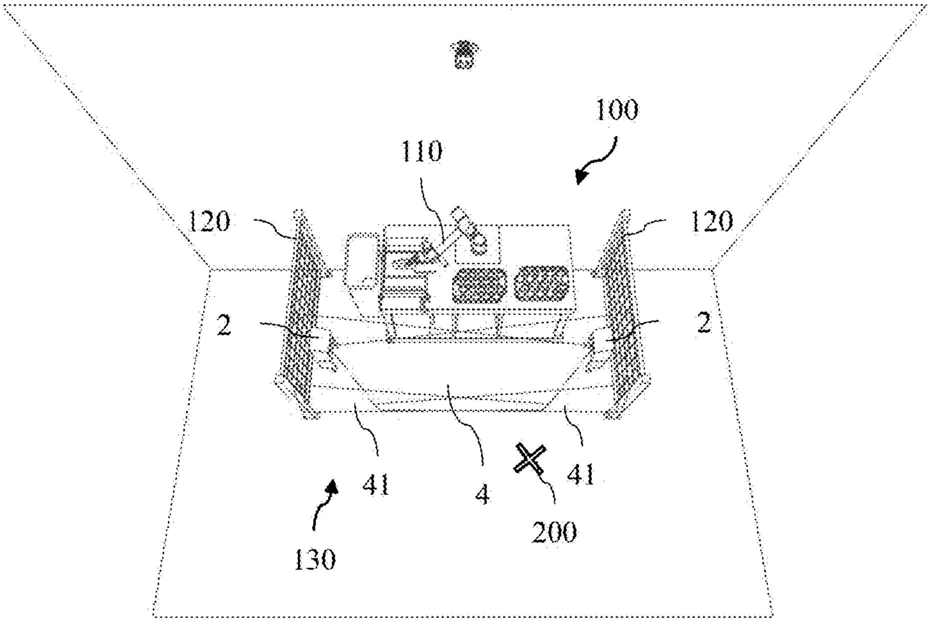

With the passage from the first to the second detection mode the set of radar sensors 2 is controlled to interrupt the detection of access of targets 200 in the first region of interest 3. Furthermore, in the second detection mode the set of radar sensors 2 is controlled to start the cyclic detection of the access of targets 200 to a second region of interest 4 occupying at least one portion of the access path 130, as shown in FIG. 4.

It should be noted that, in the first detection mode, only the first region of interest 3 is active, and not the second region of interest 4, and vice versa, in the second detection mode, only the second region of interest 4 is active, and not the first region of interest 3. The first and the second region of interest 3, 4 are shown simultaneously in FIG. 1 only to facilitate the comparison of their shapes. Therefore, the set of radar sensors 2, when controlled to detect the access of targets 200 to the first region of interest 3, is configured not to distinguish whether each target 200 is inside or outside the second region of interest 4. Similarly, the set of radar sensors 2, when controlled to detect the access of targets 200 to the second region of interest 4, is configured not to distinguish whether each target 200 is inside or outside the first region of interest 3.

Advantageously, the monitoring of the first and second radar regions 31, 41 by each radar sensor 2 is not simultaneous, but only one of the two regions 31, 41 is monitored for each detection cycle. This limits the computational burden required for each radar sensor 2.

Similarly to the first detection mode, the second region of interest 4, as a whole, is shaped to occupy all the sides of the environment 100 free of barriers 120. Furthermore, preferably, the second region of interest 4 does not cover the hazardous device 110.

Still similarly to the first detection mode, in the second detection mode, in the presence of more than one radar sensor 2, the radar sensors 2 are configured to detect together the access of targets 200 to the second region of interest 4. Thus, the second region of interest 4 can consist of the union of a plurality of second radar regions 41, monitored by distinct radar sensors 2.

For at least one radar sensor 2, the second radar region 41 is different from the first radar region 31. However, it is not excluded that there may be a radar sensor 2 for which the first and the second radar region 31, 41 coincide.

It should be noted that, in the illustrated embodiment, each active radar sensor 2 for monitoring the first region of interest 3 is also active for monitoring the second region of interest 4, and vice versa. However, in other examples, the radar sensors 2 active in the second detection mode may not coincide overall with the radar sensors 2 active in the first detection mode. In any case, at least one radar sensor 2 is active in both modes, respectively monitoring a first and a second radar region 31, 41 which are distinct from each other.

The second region of interest 4 is arranged such that it is encountered after the first region of interest 3 by a target 200 travelling the access path 130 towards the hazardous device 110. In particular, a portion of the second region of interest 4, distal from the environment 100 and/or the hazardous device 110, is closer to the environment 100 and/or the hazardous device 110 than a portion of the first region of interest 3, also distal from the environment 100 and/or the hazardous device 110.

Preferably, the first and the second region of interest 3, 4 are partially overlapping, so as not to leave uncovered regions between the first and the second region of interest 3, 4. In an embodiment, the second region of interest 4 can be a subset of the first region of interest 3.

It should be noted that, on sides of the environment 100 delimited by barriers 120, it is usually not important whether the second region of interest 4 is inside or outside the first region of interest 3, and thus in some embodiments there can be portions of the second region of interest 4 protruding from the first region of interest 3.

Since the second region of interest 4 is encountered by targets 200 which, after encountering the first region of interest 3, have continued to approach the hazardous device 110, upon the detection of the access of a target 200 in the second region of interest 4 the control system commands the hazardous device 110 to activate a second safety measure, which is different and generally more severe than the first safety measure.

In the preferred embodiment the second safety measure includes stopping at least one movable part of the hazardous device 110, preferably all its movable parts. However, other safety measures can be envisaged.

It should be noted that the safety obtained with the steps described above is equivalent to that which would be obtained, with more computational burden, by envisaging a single detection mode in which at each cycle, the set of radar sensors 2 monitors access to both the first region of interest 3 and the second region of interest 4.

If a target 200 does not enter the second region of interest 4, as shown in FIG. 4, the control system can evaluate whether or not to maintain the first safety measure. In particular, upon detecting the absence of targets 200 in the second region of interest 4 for a first predetermined time, the control system controls the set of radar sensors 2 to return from the second detection mode to the first detection mode, i.e., to interrupt the detection of the access of targets 200 in the second region of interest 4, and to re-start detecting the access of targets 200 to the first region of interest 3.

With this mode change, it is possible that the target 200 which had previously been detected in the first region of interest 3, causing the passage from the first to the second detection mode, remained in the first region of interest 3 or exited therefrom. If it has remained inside, a target 200 is immediately detected again in the first region of interest 3 and there is a return to the second detection mode. In this case, it is preferable that the first safety measure is not interrupted already at the exit from the second mode, as this interruption would have a very short duration.

Therefore, the control system commands the hazardous device 110 to interrupt the first safety measure upon the detection of the absence of targets 200 in the second region of interest 4 for the first predetermined time, required to return to the first mode, but preferably only after a further safety time has elapsed in which the absence of targets 200 in the first region of interest 3 is confirmed.

The dynamics described for the first and second region of interest 3, 4 can be extended to a sequence of three or more regions of interest 3, 4, and thus to a corresponding number of detection modes. In each detection mode, the control system controls the set of radar sensors 2 to start the detection of access of targets 200 to a respective region of interest 3, 4 in the access path 130, always one at a time.

The regions of interest 3, 4 are arranged in the access path 130 so as to be encountered according to a predetermined sequence, starting from the first and then the second region of interest 3, 4 and up to a last region of interest of the sequence, by a target 200 travelling along the access path 130 towards the hazardous device 110.

Upon the detection of the access of a target 200 in any region of interest 3, 4, which is different from the last region of interest, the control system passes to a different detection mode, controlling the set of radar sensors 2 to interrupt the detection of the access of targets 200 in the region of interest 3, 4 in question, and starting the detection of the access of targets 200 to an immediately following region of interest according to the sequence. Furthermore, distinct safety measures can be commanded upon the detection of access of a target 200 in respective regions of interest 3, 4.

Instead, upon the detection of the absence of targets 200 for a predetermined time in any region of interest, other than the first region of interest 3, the control system again changes detection mode by controlling the set of radar sensors 2 to interrupt the detection of access of targets 200 in such a region of interest, and to start the detection of access of targets 200 to an immediately preceding region of interest 2, 3 according to the sequence.

In the following, for the sake of simplicity, reference will be made to the case of two regions of interest 3, 4, it being understood that it can all be applied to longer sequences as well.

If a target 200 enters the last region of interest of the sequence, e.g., the second region of interest 4, when the set of radar sensors 2 is in the relative detection mode, e.g., the second, in an embodiment, in addition to the activation of the second safety measure, such a detection mode is simply maintained until the absence of targets 200 is detected at least for the first predetermined time.

In an alternative embodiment, upon the detection of the access of a target 200 in the last region of interest 4, the control system can command the interruption of the relative detection mode and the start of a different, further, detection mode.

Figure 5:
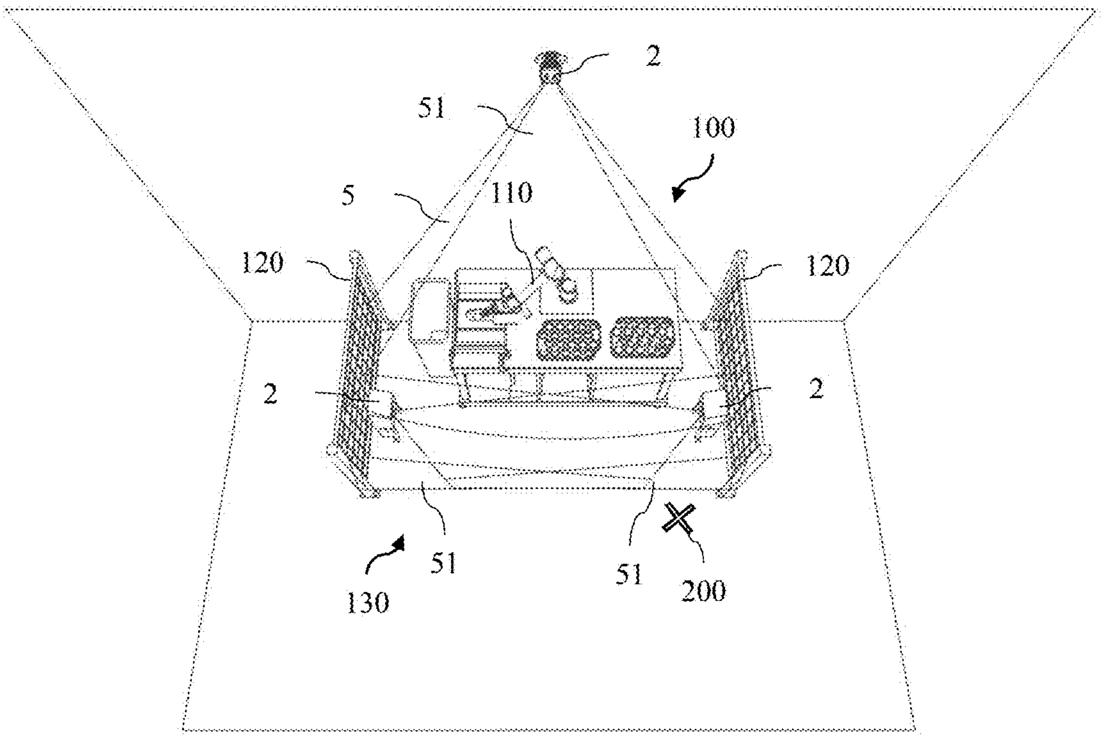

In the further detection mode, the set of radar sensors 2 is controlled to initiate the detection of targets 200 in a further region of interest 5, shown in FIG. 5, and also identified by the union of one or more further radar regions 51. The further region of interest 5 covers at least one portion of the environment 100 left uncovered by the second region of interest 4. Preferably, in addition to such a portion of the environment, the further region of interest 5 also entirely covers the second region of interest 4.

Thus, while the second region of interest 4 extends at least in the access path 130, and only optionally also in part of the environment 100, the further region of interest 5 extends at least in the environment 100, and only optionally in the access path 130.

In the illustrated embodiment, the further detection mode involves the activation of a radar sensor 2 which was inactive in the first and second detection modes. In particular, such a radar sensor 2 is configured to monitor a radar region 51 near the hazardous device 110, for example above the hazardous device 110. It is therefore not so much dedicated to detecting whether a target 200 arrives in the immediate vicinity of the hazardous device 110, a condition which is presumed to have occurred since the further mode was activated, following a detection of targets 200 in the second region of interest. Instead, it is dedicated to ensuring whether a physical interaction of a target 200 with the hazardous device 110 is in progress or has terminated.

Therefore, the radar sensors 2 active in the further detection mode may not coincide overall with the radar sensors 2 active in the first and/or second detection mode.

The detection of the presence of targets 200 in the further region of interest 5 can be interrupted, and the detection of the access of targets 200 in the first or second region of interest 3, 4, preferably the second region of interest 4, can be started again, if the absence of targets 200 in the further region of interest 5 is detected for at least a second predetermined time, equal to or different from the first predetermined time.

It should be noted that, in each detection mode, between the first, second and further detection modes, the set of radar sensors 2 can be configured to detect only the access of targets 200 to the respective regions of interest 3, 4, 5, or to detect both the access and the permanence of targets 200 therein. Such a choice can be independent for the different detection modes. For example, the first detection mode can be set to detect access only, while the second and further detection modes can be set to detect permanence as well.

More in detail, in an access-only detection mode, only moving targets 200 are detected, while the set of radar sensors 2 is insensitive to fixed targets 200, which are thus excluded from detection in the region of interest 3, 4, 5 involved.

This can be achieved in a known manner, e.g., by removing a background component representative of the fixed targets 200 only from the radar signal, and identifying the moving targets 200 following the subtraction of the background component. Consequently, the access of a moving target 200 at the region of interest 3, 4, 5 involved is detected, but following a permanence thereof in a fixed position, the target 200 is no longer detected. On the other hand, this detection mode only determines a minimum number of false alarms.

Instead, in the detection modes in which the permanence of targets 200 is also detected, the safety measures are to be avoided from being interrupted due to a target 200 which, when immobilized, is no longer detectable.

In an example, detecting the presence of targets 200 comprises detecting the presence of signal compatible with vital signs in the region of interest 3, 4, 5 involved, according to techniques that are known to the persons skilled in the art. In another example, detecting the presence of targets 200 comprises detecting both fixed and moving targets in the region of interest 3, 4, 5 involved, for example by avoiding removing the background component.

The first, the second, and if envisaged, the further region of interest 3, 4, 5 can assume overall different shapes depending on the number of radar sensors 2, the arrangement thereof, and the shape of the radar regions 31, 41, 51 monitored by the individual radar sensors 2.

In an example, each first, second and/or further radar region 31, 41, 51 is identified by a single circular sector 6 centred on the respective radar sensor 2, as shown in FIG. 1. Each circular sector 6 is delimited by two side edges 61, which are spaced from each other by a predetermined angular amplitude and which converge to the radar sensor 2, and by a circle arc 62 opposite the radar sensor 2. The circle arc 62 is spaced from the radar sensor 2 by a predetermined radius, and is connected to the side edges 61 at outer vertices 63.

For the sake of simplicity, reference is made here to the shape of a circular sector 6, but for three-dimensional detections it is to be understood that the radar region 31, 41, 51 is a volume, which is identified by a circular sector 6 in the sense that such a sector surrounds a plan of the volume, while two other surfaces, for example two planes 64 converging to the radar sensor 2, delimit the volume from above and below.

This can also be the overall shape of the first, second and/or further region of interest 3, 4, 5, if a single radar sensor 2 is envisaged. Alternatively, the region of interest 3, 4, 5 is identified (in plan) by the union of a plurality of circular sectors 6, each of a different radar sensor 2.

Figure 2:
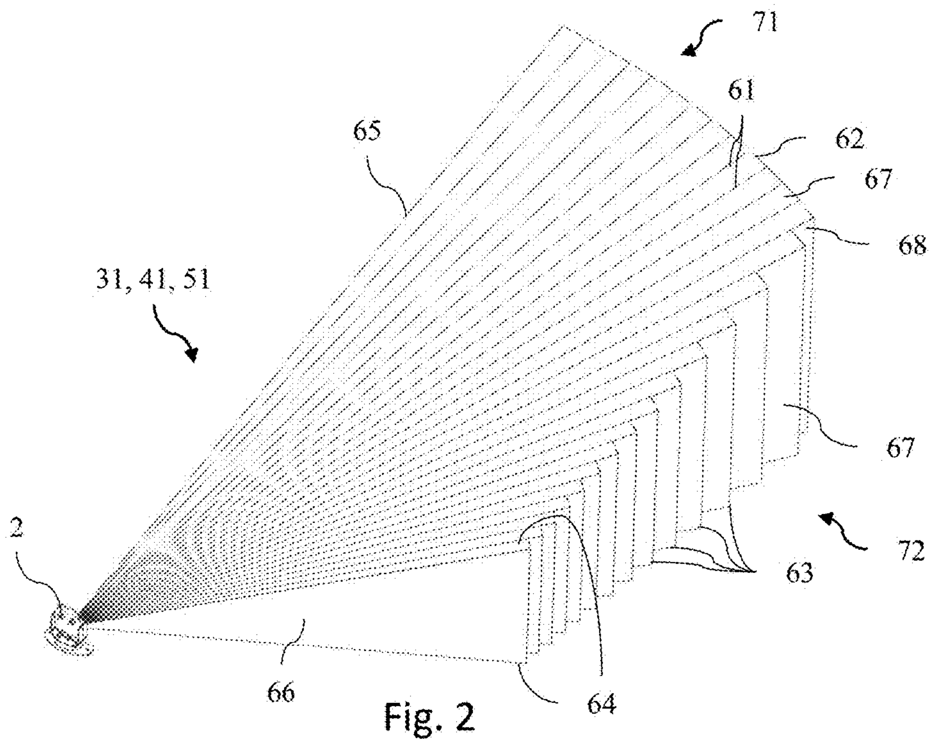
FIG. 2 shows an example of a radar region monitored by a radar sensor, usable in a system according to some embodiments of the invention.

In another example, the radar region 31, 41, 51 is identified, already for each radar sensor 2, by the union of a plurality of circular sectors 6, all centred in the same radar sensor 2, as shown in FIG. 2. The shape of the radar region 31, 41, 51 employed in FIG. 2 is also employed in FIGS. 3, 4, and 5.

Preferably, such circular sectors 6 are juxtaposed with each other along their side edges 61. A first and a second end sector 65, 66 are thus identified, and a plurality of intermediate sectors 67 between the end sectors 65, 66.

In particular, it is preferable that, among the circular sectors 6 monitored by a same radar sensor 2 in a same detection mode, at least one end sector 65, 66, optionally both, has (have) a smaller radius with respect to the intermediate sectors 67.

In the embodiment of FIG. 2, the sectors 6 of a first set 71 of circular sectors 6, from the first end sector 65 to a limit sector 68 chosen among the intermediate sectors 67, all have the same maximum radius. Furthermore, the sectors 6 of a second set 72 of circular sectors 6 have increasing radii from the second end sector 66, having minimum radius, to the limit sector 68. The outer vertices 63 of the sectors of the second set 72, in particular those outer vertices 63 facing away from the first end sector 65, are preferably aligned with each other, along a line preferably substantially parallel to a side edge 61 of the first end sector 65.

Thereby, each radar region 31, 41 can assume an irregular, asymmetrical shape approximating a four-sided shape. One of the sides is identified by a side edge 61 of the first end sector 65. Another side is identified by the circle arcs 62 of the sectors 6 of the first set 71, with maximum radius. Such a side, although not straight, but arched, becomes less arched, and more similar to a segment, the greater the maximum radius. Still another side is identified by outer vertices 63 of the sectors 6 of the second set 72, which are preferably at least three, but more preferably are much more numerous, for example at least ten. A last side is identified by a side edge 61 of the second end sector 66, with minimum radius.

Depending on the mutual orientation of the first and second end sectors 65, 66, the radar region 31, 41, 51 can assume an overall polyhedral shape, with an approximately rectangular plan, for example a substantially parallelepiped shape, in particular when the end sectors 65, 66 identify an angle of substantially 90°. Alternatively, as illustrated in the figures, while, the shape of a single radar region 31, 41, 51 has substantially no rectangular plan, pairs of radar sensors 2 can be arranged so that the union of their radar regions 31, 41, 51 is approximately rectangular in plan. To this end, the first end sectors 65, 66 of each radar sensor 2 of the pair are oriented towards the other radar sensor 2 of the pair.

In another embodiment, not shown, the circular sectors 6 of a first set of sectors of the radar region 31, 41, 51 have increasing radii from the first end sector 65, up to a first limit sector with maximum radius. Furthermore, the circular sectors 6 of a second set of sectors have increasing radii from the second end sector 66, to a second limit sector with maximum radius. Preferably, the circular sectors of a third set of sectors, between the first and the second set, have a constant radius equal to the maximum radius.

Preferably, the outer vertices 63 of the sectors 6 of the first set, in particular these outer vertices 63 facing away from the second end sector 66, are aligned with each other on a first line, and the outer vertices 63 of the sectors 6 of the second set, in particular these outer vertices 64 facing away from the first end sector 65, are aligned with each other on a second line, preferably parallel to the first line. There are thus two sides identified, respectively, by outer vertices 63 of sectors 6 of the first and the second set. The arrangement of the first and second set of sectors may or may not be symmetrical. Furthermore, a sector with minimum radius may be the first or second end sector, or both.

Again, with a suitable arrangement of a pair of radar sensors 2, facing each other, the union of the respective regions of interest 31, 41, 51 can be obtained substantially rectangular in plan.

Also in these examples, the overall shape of the first and/or second region of interest 3, 4 may coincide with the shape of a single radar region 31, 41, 51, if there is only one radar sensor 2, or may assume more complex shapes, given by the union of one or more radar regions 31, 41, 51 or pairs of substantially quadrangular radar regions 31, 41, 51, in the sense understood above, and optionally one or more radar regions 31, 41, 51 given by a single circular sector. In these cases, at least one side of at least one radar region 31, 41, 51, and at least one side of the region of interest 3, 4, 5 is identified by a sequence of outer vertices 63 of circular sectors 6 aligned with each other, preferably at least three circular sectors 6.

It should be noted that the use of relatively complex radar regions 31, 41, 51, which may be given by multiple circular sectors 6 for a single radar sensor 2, on the one hand increases the computational burden, but to an acceptable extent, since there is no simultaneous monitoring of the first, second (and if envisaged further) region of interest 3, 4, 5. On the other hand, this renders the overall shape obtainable for the first, second or further region of interest 3, 4, 5 versatile, without excessively increasing the number of radar sensors 2.

At the same time, the choice of a small number of possible shapes for the radar regions 31, 41, 51, for example the quadrangular shapes mentioned above, without including numerous possible customisations, simplifies the firmware of the radar sensors 2.

Obviously, a person skilled in the art will be able to make numerous equivalent modifications to the variants set forth above, without thereby departing from the scope of protection as defined by the appended claims.

The invention claimed is:

1. Method for controlling access to an environment, comprising:

positioning a set of one or more radar sensors along an access path to an environment in which a hazardous device is present, controlling the set of radar sensors to start a first detection mode to detect access of targets to a first region of interest in the access path, upon the detection of the access of a target in the first region of interest:

commanding the hazardous device to activate a first safety measure, controlling the set of radar sensors to interrupt the detection of the access of targets in the first region of interest, and controlling the set of radar sensors to start a second detection mode to detect access of targets to a second region of interest in the access path, the second region of interest being arranged to be encountered after the first region of interest by a target travelling the access path towards the hazardous device, wherein a specific radar sensor of the set of one or more radar sensors is active in both modes, the specific radar sensor monitoring a first radar region in the first detection mode and a second radar region in the second detection mode, wherein the first radar region is the whole or part of the first region of interest, and the second radar region is the whole or part of the second region of interest and is distinct from the first radar region, upon the detection of the access of a target in the second region of interest, commanding the hazardous device to activate a second safety measure, different from the first safety measure, and upon detection of absence of targets in the second region of interest for a first predetermined time:

controlling the set of radar sensors to interrupt the detection of the access of targets in the second region of interest, and controlling the set of radar sensors to start the detection of access of targets to the first region of interest.

2. Method according to claim 1, wherein the first and/or second region of interest is identified by the union of a plurality of circular sectors.

3. Method according to claim 1, wherein the first region of interest and the second region of interest consist in the union, respectively, of a plurality of first radar regions monitored by distinct radar sensors, and of a plurality of second radar regions monitored by distinct radar sensors.

4. Method according to claim 3, wherein at least one first and/or second radar region has a shape with a plurality of sides, wherein at least one side is identified by a sequence of outer vertices of circular sectors aligned with each other, preferably at least three circular sectors.

5. Method according to claim 1, wherein:

the set of radar sensors, when controlled to detect the access of targets to the first region of interest, is configured not to distinguish whether each target is inside or outside the second region of interest, and the set of radar sensors, when controlled to detect the access of targets to the second region of interest, is configured not to distinguish whether each target is inside or outside the first region of interest.

6. Method according to claim 1, comprising controlling the set of radar sensors to start detection of access of targets to three or more regions of interest in the access path, one at a time, including the first region of interest and the second region of interest, the regions of interest being arranged so as to be encountered according to a predetermined sequence by a target travelling the access path towards the hazardous device, by means of the steps of:

upon the detection of the access of a target in each region of interest other than a last region of interest of the sequence, controlling the set of radar sensors to interrupt the detection of the access of targets in the region of interest, and to start detection of access of targets to a subsequent region of interest according to the sequence, and upon detection of absence of targets for a predetermined time in each region of interest other than a first region of interest of the sequence, controlling the set of radar sensors to interrupt the detection of the access of targets in the region of interest, and to start detection of access of targets to a previous region of interest according to the sequence.

7. Method according to claim 1, comprising:

upon the detection of the access of a target in the second region of interest:

controlling the set of radar sensors to interrupt the detection of the access of targets in the second region of interest, controlling the set of radar sensors to start detection of targets in a further region of interest in the access path, which covers at least one portion of the environment left uncovered by the second region of interest, upon detection of absence of targets in the further region of interest for a second predetermined time:

controlling the set of radar sensors to interrupt the detection of permanence of targets in the further region of interest, and controlling the set of radar sensors to start the detection of the access of targets to the first or second region of interest.

8. Method according to claim 1, wherein the hazardous device is a machine with a movable part, the first safety measure includes slowing a movement speed of the movable part, and the second safety measure includes stopping the movable part.

9. Method according to claim 1, comprising, upon detection of absence of targets in the second region of interest for the first predetermined time, commanding the hazardous device to interrupt the first safety measure, preferably after a safety time passes while detecting absence of targets in the first region of interest.

10. System for controlling access to an environment, comprising a set of one or more radar sensors positioned along an access path to an environment in which a hazardous device is present, and a control system configured for:

controlling the set of radar sensors to start a first detection mode to detect access of targets to a first region of interest in the access path, upon the detection of the access of a target in the first region of interest by the set of radar sensors:

generating a control signal for the activation of a first safety measure by the hazardous device, controlling the set of radar sensors to interrupt the detection of the access of targets in the first region of interest, and controlling the set of radar sensors to start a second detection mode to detect access of targets to a second region of interest in the access path, the second region of interest being arranged to be encountered after the first region of interest by a target travelling the access path towards the hazardous device, wherein a specific radar sensor of the set of one or more radar sensors is active in both modes, the specific radar sensor monitoring a first radar region in the first detection mode and a second radar region in the second detection mode, wherein the first radar region is the whole or part of the first region of interest, and the second radar region is the whole or part of the second region of interest and is distinct from the second radar region, upon the detection of the access of a target in the second region of interest by the set of radar sensors, generating a command signal for the activation of a second safety measure by the hazardous device, different from the first safety measure, and upon detection of absence of targets in the second region of interest by the set of radar sensors for a first predetermined time:

controlling the set of radar sensors to interrupt the detection of the access of targets in the second region of interest, and controlling the set of radar sensors to start the detection of access of targets to the first region of interest.

* * * * *